US010543553B2

(12) United States Patent
O'Connor (10) Patent No.: US 10,543,553 B2
(45) Date of Patent: Jan. 28, 2020

(54) HIGH CURRENT AC WELDER

(71) Applicant: Lincoln Global, Inc., City of Industry, CA (US)

(72) Inventor: James J. O'Connor, Jefferson, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 15/452,136

(22) Filed: Mar. 7, 2017

(65) Prior Publication Data

US 2017/0173721 A1    Jun. 22, 2017

Related U.S. Application Data

(60) Continuation of application No. 14/278,408, filed on May 15, 2014, now Pat. No. 9,592,566, which is a division of application No. 11/375,767, filed on Mar. 15, 2006, now abandoned.

(51) Int. Cl.
*B23K 9/10*        (2006.01)

(52) U.S. Cl.
CPC .......... *B23K 9/1081* (2013.01); *B23K 9/1043* (2013.01)

(58) Field of Classification Search
CPC ...... B23K 9/10; B23K 9/1006; B23K 9/1043; B23K 9/1081
USPC .. 219/130.1, 130.5, 130.51, 133, 134, 137.7
See application file for complete search history.

(56) References Cited

U.S. PATENT DOCUMENTS

| | | |
|---|---|---|
| 3,665,495 A | 5/1972 | Carter |
| 4,438,317 A | 3/1984 | Ueguri et al. |
| 4,479,046 A | 10/1984 | Mizuno et al. |
| 4,824,382 A | 4/1989 | Ryan |
| 5,198,698 A | 3/1993 | Paul |
| 5,264,679 A | 11/1993 | Martin |
| 5,499,178 A * | 3/1996 | Mohan ............ H02J 3/01 307/105 |

(Continued)

FOREIGN PATENT DOCUMENTS

GB        1508485        4/1978

OTHER PUBLICATIONS

Search report for application EP 07757397, dated Feb. 25, 2011.

*Primary Examiner* — Dana Ross
*Assistant Examiner* — Ayub A Maye
(74) *Attorney, Agent, or Firm* — Brad C. Spencer (57) ABSTRACT

A welding assembly and method is described which includes a charging circuit and regulator coupled to an input power source; an energy storage element connected in parallel with the charging circuit and regulator to increase the weld current output, wherein the energy storage element is charged by the charging circuit and regulator; and a weld output controller connected in parallel with the energy storage element for controlling a welding arc between an electrode and a workpiece, wherein the weld output controller includes a forward converter/inverter including a series circuit of a primary winding of a transformer, and a switching element which is coupled to the energy storage element, and a rectifier smoothing circuit which rectifies and smoothes a voltage induced in a secondary winding of the transformer according to a switching operation of the switching element, wherein the rectifier smoothing circuit conducts during an ON period of the switching element.

20 Claims, 6 Drawing Sheets

(56) References Cited

U.S. PATENT DOCUMENTS

| | | | |
|---|---|---|---|
| 5,849,426 A | 12/1998 | Thomas et al. | |
| 5,991,169 A | 11/1999 | Kooken | |
| 6,069,811 A * | 5/2000 | Moriguchi | H02H 7/1257 363/142 |
| 6,091,612 A * | 7/2000 | Blankenship | B23K 9/1025 323/208 |
| 6,291,798 B1 * | 9/2001 | Stava | B23K 9/1006 219/130.32 |
| 6,331,694 B1 | 12/2001 | Blankenship | |
| 6,504,132 B1 | 1/2003 | Church | |
| 6,671,190 B2 | 12/2003 | Takegami | |
| 6,760,236 B2 | 7/2004 | Hsieh | |
| 6,777,649 B2 | 8/2004 | Reynolds et al. | |
| 6,982,398 B2 | 1/2006 | Albrecht | |
| 7,183,517 B2 | 2/2007 | Albrecht et al. | |
| 7,339,134 B2 | 3/2008 | Stropki, Jr. et al. | |
| 7,385,159 B2 * | 6/2008 | Stava | B23K 9/1043 219/130.4 |
| 7,838,797 B2 | 11/2010 | Albrecht | |
| 2002/0075709 A1 | 6/2002 | Schwartz et al. | |
| 2005/0109748 A1 | 5/2005 | Albrecht et al. | |
| 2005/0224478 A1 | 10/2005 | Stropki, Jr. et al. | |
| 2005/0224481 A1 | 10/2005 | Nadzam et al. | |
| 2006/0011595 A1 | 1/2006 | Daniel et al. | |
| 2006/0015595 A1 | 1/2006 | Shantala et al. | |
| 2006/0037953 A1 | 2/2006 | Matthews et al. | |
| 2006/0103365 A1 * | 5/2006 | Ben-Yaacov | H02M 5/293 323/313 |
| 2006/0213891 A1 * | 9/2006 | Stava | B23K 9/091 219/130.21 |
| 2007/0187376 A1 | 8/2007 | Albrecht et al. | |

* cited by examiner

HIGH CURRENT AC WELDER

CROSS-REFERENCE TO RELATED APPLICATIONS

This application claims priority to, is a continuation of, and fully incorporates by reference, U.S. patent application Ser. No. 14/278,408 filed on May 15, 2014, which application is a divisional of, and fully incorporates by reference, U.S. patent application Ser. No. 11/375,767 filed on 15 Mar. 2006 and fully incorporates by reference U.S. patent application Ser. No. 10/919,815, filed Aug. 17, 2004, entitled "HYBRID POWERED WELDER" and U.S. patent application Ser. No. 10/815,536, filed Apr. 1, 2004, entitled "EXTENSION LIFT TRUCK MODIFICATION."

TECHNICAL FIELD

The present invention relates generally to the art of welding. It finds particular application in conjunction with high current welding power supplies receiving an AC input, and it will be described with particular reference thereto. However, it is to be appreciated that the present invention is also amenable to other like applications.

BACKGROUND OF THE INVENTION

Many welding applications need to be performed using welding power supplies that are able to be plugged into a standard 110-120 volt AC, 60 Hz outlet, such as the type that may be found in most homes, offices, and businesses. Because of the low output voltage of the standard AC outlet, a relatively high current is needed from the outlet to melt the electrode and base material. However, the typical AC input for such an outlet may be limited to only 15 (or 30) amps by a circuit breaker, which may also serve other AC outlets as well. Accordingly, the power that may be obtained from such an AC outlet is limited, thus further limiting the power that may be provided to the weld.

Since standard AC outlets are limited to 15 (or 30) amps typically, this only allows for approximately 1800 (or 3600) watts of power for welding applications. Thus, for example, assuming a 90% efficient design and a power factor of 1, the available welding power for a 30 amp circuit at 120 volts AC would be only 3240 watts. For various welding processes, this amount of power would produce the following welding currents: Stick Welding—130 A; MIG Welding—150 A; and TIG Welding—185 A.

This power is available 100% of the time. However, many welding applications need more current. Thus, because most welding is not at 100% duty cycle, it would be helpful to use the power during the non-welding time to charge an energy storage device. Such a device could be any number of things—most commonly a battery. This stored energy alone or combined with power from the outlet can be used to produce any amount of welding power.

Some prior art AC welders provided an unbalanced output to offset the naturally occurring unbalanced load when using a tungsten electrode, while yet other types of known welding power supply use only battery power as an input. However, these types of power supplies are generally limited in the amount and in the duration of power that they can provide for welding applications.

U.S. Pat. No. 6,777,649 relates to a welding-type power supply that uses an energy storage device, such as a battery, as a voltage boost mechanism. Generally, this patent provides for welding from a standard AC duplex outlet and provides up to a 150 amp output, at an output voltage of up to about 25 volts. A battery is provided after the voltage regulation and in series with the welding output, such that the battery simply "boosts" (or adds to) the output voltage. Thus, the power circuit need only provide a 12 volt. output, with an additional 12 volts coming from the battery. However, the power supply in this patent does not pull any extra current from the energy storage element, i.e., the battery is not being charged during the non-welding time.

Thus, it would be preferable to use an energy storage element that can be charged from a standard 110-120 volt AC outlet at a 15 to 30 amp rate, but will also be able to provide higher power output for short periods of time for a welding operation. By using different charging systems, the welder could be adapted to work with various input supplies, AC or DC, as well as high or low power levels. Using such a system, it would be possible to get unlimited welding current. The amount of welding current would be dependent on the size of the energy storage element.

SUMMARY OF THE INVENTION

In accordance with an aspect of the present invention, there is provided an electric arc welding assembly comprising a charging circuit and regulator coupled to an input power source, an energy storage element connected in parallel with the charging circuit and regulator to increase the weld power output, and a weld output controller connected in parallel with the energy storage element for controlling a welding arc between an electrode and a workpiece.

In accordance with other aspects of the present invention, the energy storage element may comprise at least one battery and/or at least one capacitor. Optionally, at least one battery and at least one capacitor may be connected in parallel, to provide additional power for certain welding applications.

In accordance with yet other aspects of the present invention, the weld output controller may comprise various types and combinations of circuits. For example, the weld output controller may comprise a DC down chopper, wherein the DC down chopper includes a pulse width modulator that at least partially controls the welding current to the electrode and a waveform generator that at least partially controls the pulse width modulator, the DC down chopper creating a series of current pulses that constitute a welding cycle representative of a current waveform, the pulse width modulator controlling a current pulse width of a plurality of the current pulses. Likewise, the weld output controller may comprise a forward converter/inverter, wherein the forward converter/inverter includes a series circuit of a primary winding of a transformer and a switching element, which is coupled to the energy storage element and a rectifier smoothing circuit which rectifies and smoothes a voltage induced in a secondary winding of the transformer according to a switching operation of the switching element, wherein a rectifier element of the rectifier smoothing circuit conducts during an ON period of the switching element. The weld output controller may also comprise a boost converter.

Moreover, the weld output controller may comprise a combination of power topologies. These could have high and low current capability. Thus, the weld output controller may comprise a current limited boost circuit connected in parallel with a high current circuit, such as a DC down chopper, for certain applications. This combination circuit would offer particular advantages when stick welding with energy storage elements of less than 70 volts. Some stick electrodes, such as the E-6010 class from The Lincoln Electric Company of Cleveland, Ohio, require high currents from 100 to 300 amps at 25 volts and below, but they also require a higher voltage from around 50 to 60 volts at a lower current (60 amps) to produce an acceptable arc.

In accordance with yet other aspects of the present invention, the input power source may comprise a 110-120 volt AC wall outlet or a 220-240 volt AC wall outlet, and the apparatus may also include an input cord and three-prong plug for connecting to the appropriate AC wall outlet.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawing which form a part hereof, and wherein.

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
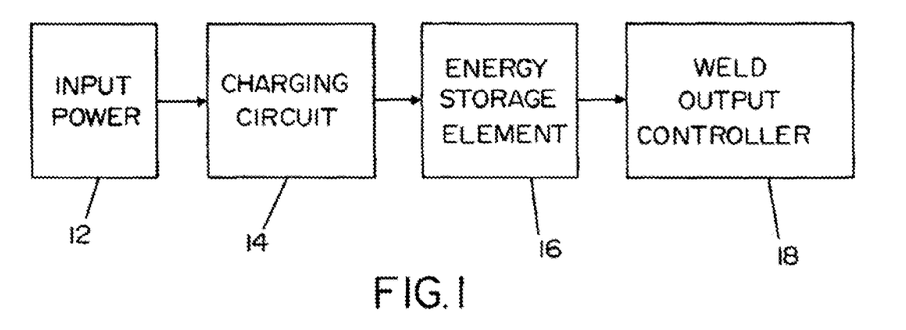
FIG. 1 is a block diagram of a high current AC welding assembly in accordance with aspects of the present invention.

Referring now to the drawings wherein the showings are for the purpose of illustrating the preferred embodiment and its advantages only and not for the purpose of limiting same, in which like numerals indicate corresponding parts throughout the several views, FIG. 1 is a simplified block diagram of a high current AC welding assembly. As shown, the high current AC welding assembly generally includes an input power source 12, a charging circuit 14, an energy storage element 16, and a weld output controller 18.

The input power source 12 typically comprises a grounded 110-120 volt AC, 60 Hz wall outlet, although other suitable input power sources may be utilized, such as AC utility power of different voltages (e.g., heavy duty 220-240 volt AC outlets) as well as AC voltage from a generator. Thus, although not shown, the high current welding assembly would also typically include an input cord and three-prong plug for connecting to an AC wall outlet.

As stated above, the high current welding assembly includes an energy storage element 16, which typically comprises one or more cells, batteries, or capacitors. The actual voltage of the energy storage element 16 may vary, depending on the needs of the welding application. For example, the energy storage element 16 may comprise a standard 12 volt battery or a 48 volt battery pack. The voltage selected depends upon the type of power converter coupled to it. For a 12 volt battery, some type of boost would be used to get to the welding voltage. If something higher like 24 volts is used, then boost and/or down choppers could be used.

The charging circuit 14 is coupled to receive electrical power from the input power 12. The charging circuit 14 is also coupled to the energy storage element 16 by way of a switch (not shown), such that when a normal signal level is maintained on the input power 12, electrical power is restored in the energy storage element 16 by the charging circuit 14, if required. Charging circuits are well known in the art, with the simplest form of charging circuit consisting of a transformer, rectifier and limiting resistor. Of course, various known types of charging circuits may be suitable for use with the high current welding assembly.

The energy storage element 16 may operate, for example, at a level of about 12 volts DC, as is common for lead acid type batteries, whereas the input power 12 may be of the order of 120 volts AC. Thus, in that situation, the charging circuit 14 steps down the AC voltage from the input power 12 and converts it to a DC voltage so as to be compatible with the energy storage element 16.

The weld output controller 18 may comprise any one or a combination of common welding power supply circuits, including, but not limited to, a DC chopper, a forward converter/inverter and/or a boost converter. The high current AC welding assembly may be adapted to provide a weld output for multi-process welding applications such as stick, TIG, MIG, flux cored, gouging, pulsed MIG and TIG applications, as well as for plasma cutting applications. It is to be understood that the welding output could be controlled in other ways, such as, for example, by regulating wire feed speed of a spool gun.

In operation, the input power 12 is directed to the charging circuit and regulator 14, which is used to monitor and control the charging of the energy storage element 16. Typically, in operation, current from the input power source 12 is combined with current from the energy storage element 16, whereby the total current is directed to the weld output and is controlled by the weld output controller 18.

While the energy storage element 16 is supplying current to the weld output controller 18, the charging circuit 14 can be designed such that no charging of the energy storage element 16 occurs. However, when the battery is not supplying current to the weld output, the charging circuit 14 can be designed to direct rectified current from the AC input power 12 to the energy storage element 16 to recharge it. As can be appreciated, the current from the input power 12 can be directed to an electrode when an electric arc is being generated. As can also be appreciated, the current from the input power 12 can be directed to the energy storage element 16 even when an electric arc is being generated.

Various embodiments of the high current AC welding assembly are shown in FIGS. 2-7.

Figure 2:
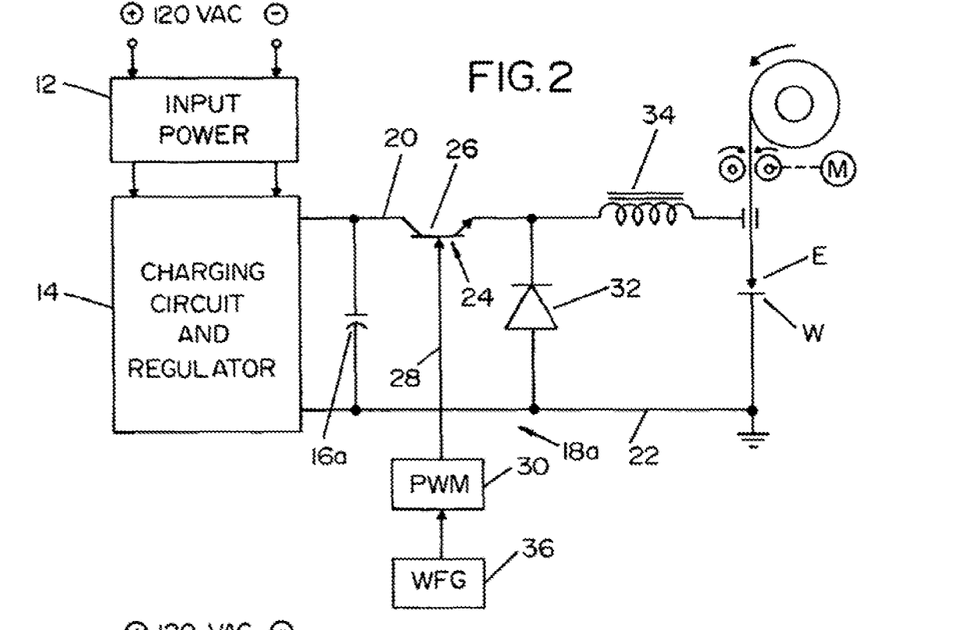
FIG. 2 shows a simplified schematic of an embodiment of the high current AC welder using a DC down chopper and a battery.

For example, FIG. 2 shows a simplified schematic of one embodiment of the disclosed invention. More particularly, FIG. 2 shows a high current AC welding assembly, which includes the 120 volt AC input power source 12 coupled to the charging circuit and regulator 14, a capacitor 16a connected in parallel with the charging circuit and regulator 24, wherein the capacitor 16a functions as the energy storage element 16, and a common DC down chopper 18a connected in parallel with the capacitor 16a, wherein the down chopper 18a controls the current between an electrode E and a workpiece W, i.e., the weld output. As shown in FIGS. 2-7, the welding assembly includes a wire feeder. However, it is to be understood that the welding assembly may be used in conjunction with welding applications where no wire feeder would be needed.

In operation, the capacitor 16a provides a DC input across a pair of input leads 20, 22, which leads are illustrated as the input to the down chopper 18a. The chopper 18a includes a switching stage 24, which further includes a switching device 26, such as a MOSFET with an isolated optically coupled IGBT (Insulated Gate Bipolar Transistor) driver (not shown) switched according to the pulses on a feedback input driven by a standard optical coupler at a frequency of between 20-40 kHz. Of course, it is to be understood that the switching device 26 could be a BJT (Bipolar Junction Transistor) or an IGBT instead of a MOSFET. In practice, the pulses on the input to the driver are from the output 28 of a pulse width modulator (PWM) 30. The pulses of the pulse width modulated output cause the switching device 26 to be opened and closed at a given rate, typically 20 kHz, with the duty cycle being controlled to determine the amount of current directed across electrode E and workpiece W.

A freewheeling diode 32 is connected in parallel with the welding operation and behind a parallel choke (or inductor) 34 of the switching stage 26. In accordance with standard technology, a waveform generator 36 drives the PWM 30 at a preferred frequency of 20 kHz. In this way, the PWM 30 and the waveform generator 36 function define a control circuit for the down chopper 18a. It is to be understood that the operating frequency can be set at various levels in the normal radio frequency range of 20-100 kHz.

The down chopper 18a functions in accordance with standard chopper technology, with the duty cycle of the pulses on line 28 controlling the current applied to the arc between the electrode E and the workpiece W. Thus, in operation, the DC current is applied through the switching device 26 to the inductor 34. By turning the switching device 26 on and off, current in the inductor 34 and the arc between the electrode E and the workpiece W can be controlled. When the switching device 26 is closed, current is applied through the inductor 34 to the arc. When the switching device 26 opens, current stored in the inductor 34 sustains flow in the arc and through the diode 32. The repetition rate of switch closure is preferably 20 KHz, which allows for ultra-fast control of the arc. By varying the ratio of on-time versus off-time of the switching device 26 (i.e., the duty cycle), the current applied to the arc between the electrode E and the workpiece W is controlled.

Figure 3:
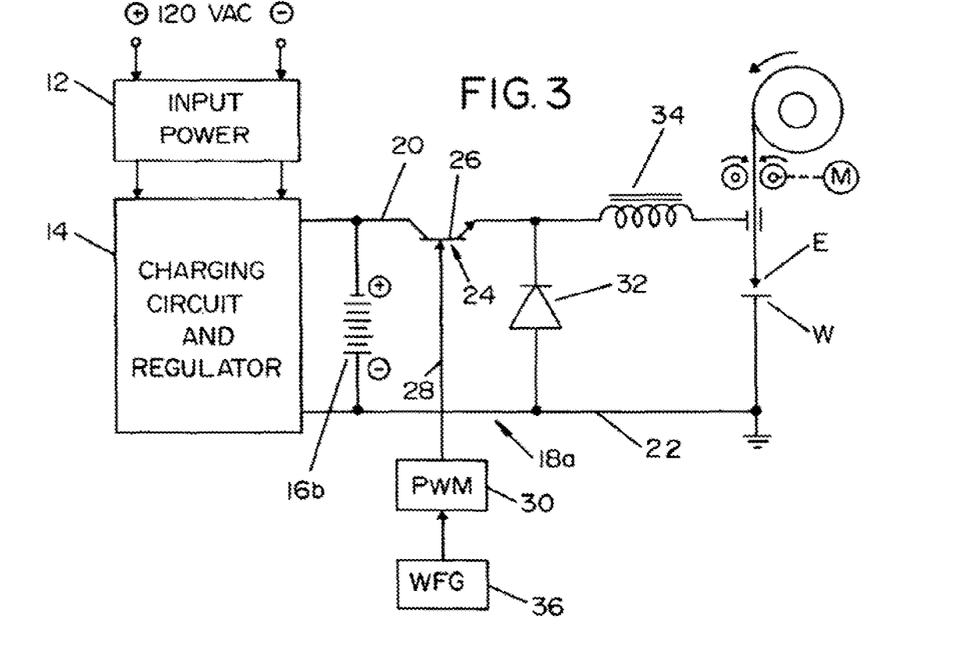
FIG. 3 shows a simplified schematic of an alternative embodiment of the high current AC welder using a DC down chopper and a capacitor.
Figure 4:
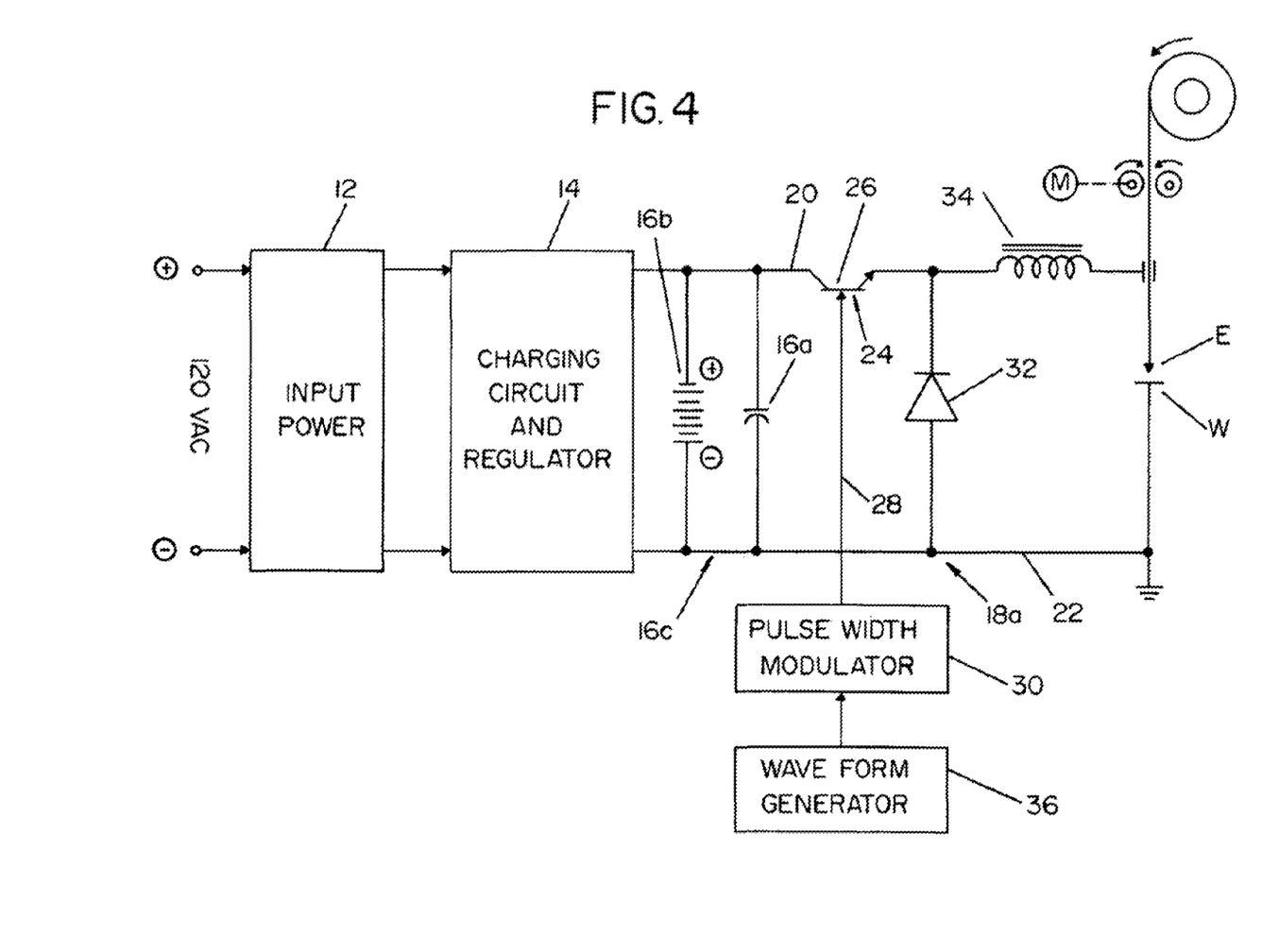
FIG. 4 shows a simplified schematic of an alternative embodiment of the high current AC welder using a DC down chopper, as well as a battery and capacitor in parallel.

Of course, it is to be understood that many other variations of the high current welding assembly are possible. For example, FIGS. 3 and 4 show alternative high current welding assemblies, which are similar in most respects to the welding assembly shown in FIG. 2. As shown in FIG. 3, the energy storage element may comprise a battery 16b instead of the capacitor 16a. And, as shown in FIG. 4, the energy storage element 16c may comprise the capacitor 16a and the battery 16b connected in parallel to provide additional current to the weld output as needed.

Figure 5:
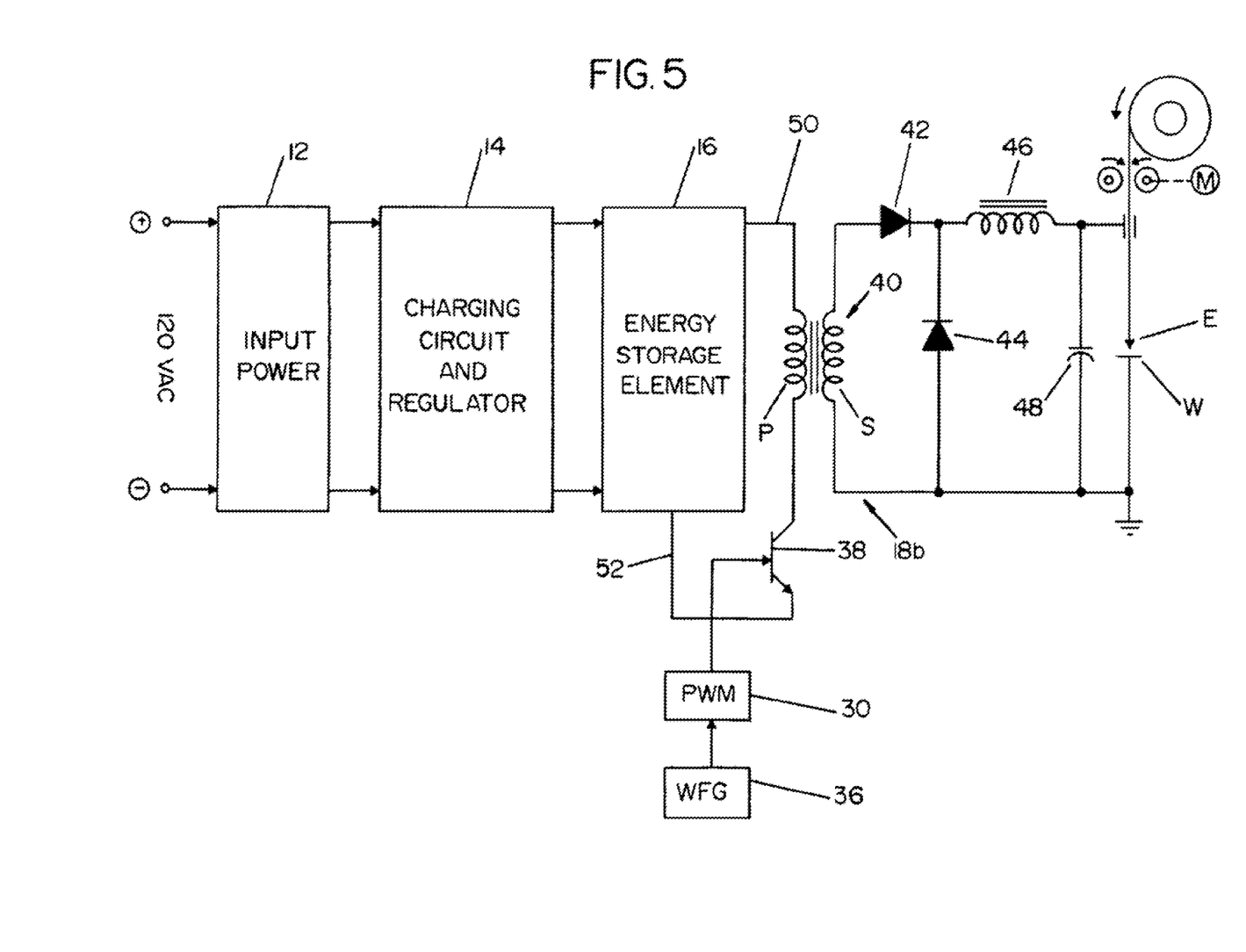
FIG. 5 shows a simplified schematic of an alternative embodiment of the high current AC welder using forward converter/inverter.

FIG. 5 shows an alternative embodiment of the present invention. This embodiment includes the 120 volt AC input power source 12 coupled to the charging circuit and regulator 14, the energy storage element 16, such as the capacitor 16a and/or the battery 16b, connected in parallel with the charging circuit and regulator 14, and a common forward converter/inverter 18b connected in parallel with the energy storage element 16, whereby the forward converter/inverter 18b controls a current between the electrode E and the workpiece W, i.e., the weld output.

The one-transistor forward converter/inverter is probably the most elementary type of transformer-isolated buck converter. This configuration is widely used in converting direct current (DC) voltage into another value of DC voltage, and in inverters. Inverters convert direct current into alternating current (AC). It is usually used in a circuit known as a "forward converter" circuit. It is to be understood, however, that the name for the "forward converter" circuit varies from industry to industry and from person to person. It may also be referred to as an "inverter," "DC converter," "buck," "feed forward," and others.

As shown in FIG. 5, a power switch 38 is coupled in series with the primary winding P of a transformer 40. Each time, the power switch 38 is turned on and off and is controlled by the gate driving signals of the pulse-width-modulated (PWM) controller 30. The secondary side of the converter 18b has a forward rectifier 42 coupled to the secondary winding S of the transformer 40, a free-wheeling rectifier 44 and an output filter consisting of an output choke 46 and an output capacitor 48. The output filter transfers DC energy to the load from the primary side DC source 16 across a pair of input leads 50, 52, which leads are illustrated as the input to the forward converter 18b. A voltage induced in the secondary winding S of the transformer 40 according to the power switch 38 is rectified and smoothed so that a DC output voltage is developed between the electrode E and the workpiece W coupled across the output capacitor 48.

When the power switch 38 is turned on, the voltage from the energy storage element 16 is applied across the primary winding P of the transformer 40, and the voltage is coupled to the secondary winding S. The positive end of the secondary winding S is turned positive, and the forward rectifier 42 is turned on, the free-wheeling rectifier 44 is turned off, and the forward power current flows to the output choke 46, the output capacitor 48 and the load.

When the power switch 38 is turned off, the positive end of the secondary winding S is turned negative. The forward rectifier 42 is turned off and the free-wheeling rectifier 44 must be turned on because the power current of the output choke 46 must be forwarded continually to the output load by the free-wheeling rectifier 44. The waveform generator 36 drives the PWM 30 at a preferred frequency of 20 kHz. However, this frequency can be at various levels in the normal radio frequency range of 20-100 kHz.

Figure 6:
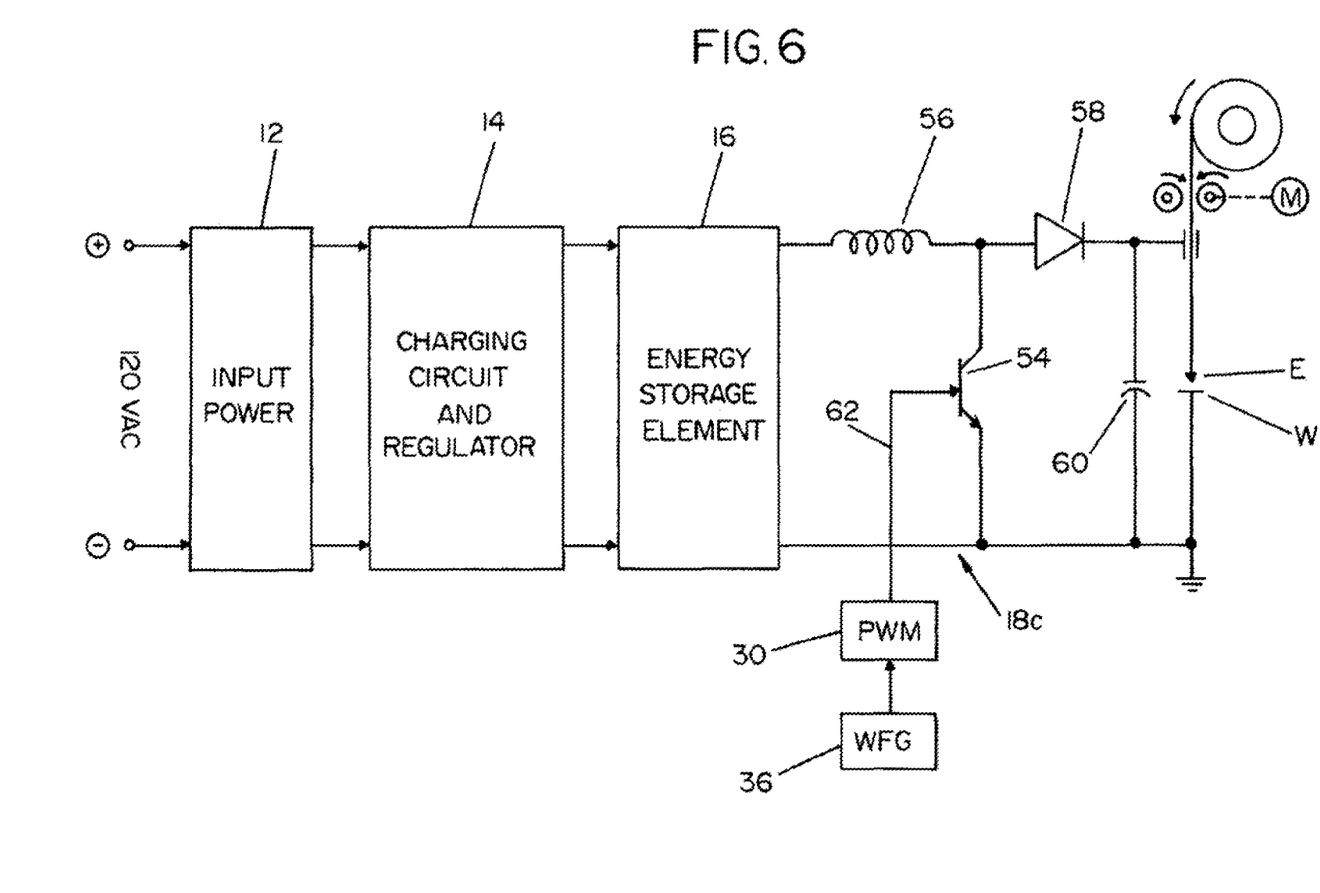
FIG. 6 shows a simplified schematic of an alternative embodiment of the high current AC welder using a boost converter.

FIG. 6 shows yet another embodiment of the high current welding assembly. In this embodiment, the high current AC welding assembly includes the 120 volt AC input power source 12 coupled to the charging circuit and regulator 14, the energy storage element 16 connected in parallel with the charging circuit and regulator 14, and a basic boost converter 18c connected in parallel with the energy storage element 16, whereby the boost converter 18c controls a current between an electrode E and a workpiece W, i.e., the weld output.

The basic boost converter 18c is generally no more complicated than a buck converter but has the components arranged differently in order to step up the voltage. The operation consists of using a switching power MOSFET 54 as a high speed switch, with output voltage control by varying the switching duty cycle. When the switch 54 is switched on, current flows from the input source through an inductor 56 and the switch 54 and energy is stored in the magnetic field of the inductor 56. There is no current through a diode 58, and the load current is supplied by the charge in a capacitor 60 connected in parallel. Then, when the switch 54 is turned off, the inductor 56 opposes any drop in current by immediately reversing its EMF, so that the inductor voltage adds to (or "boosts") the source voltage and current due to this boosted voltage now flows from the source through the inductor 56, the switch 54 and the load, recharging the capacitor 60 as well. The output voltage is therefore higher than the input voltage.

The pulses on the input to the driver are from the output 62 of the PWM 30. The pulses of the output cause the switch 54 to be opened and closed at a rate of 20 kHz, with the duty cycle being controlled to determine the amount of current directed across electrode E and workpiece W. The waveform generator 36 drives the PWM 30 at a preferred frequency of 20 kHz. However, this frequency can be at various levels in the normal radio frequency range of 20-100 kHz.

Figure 7:
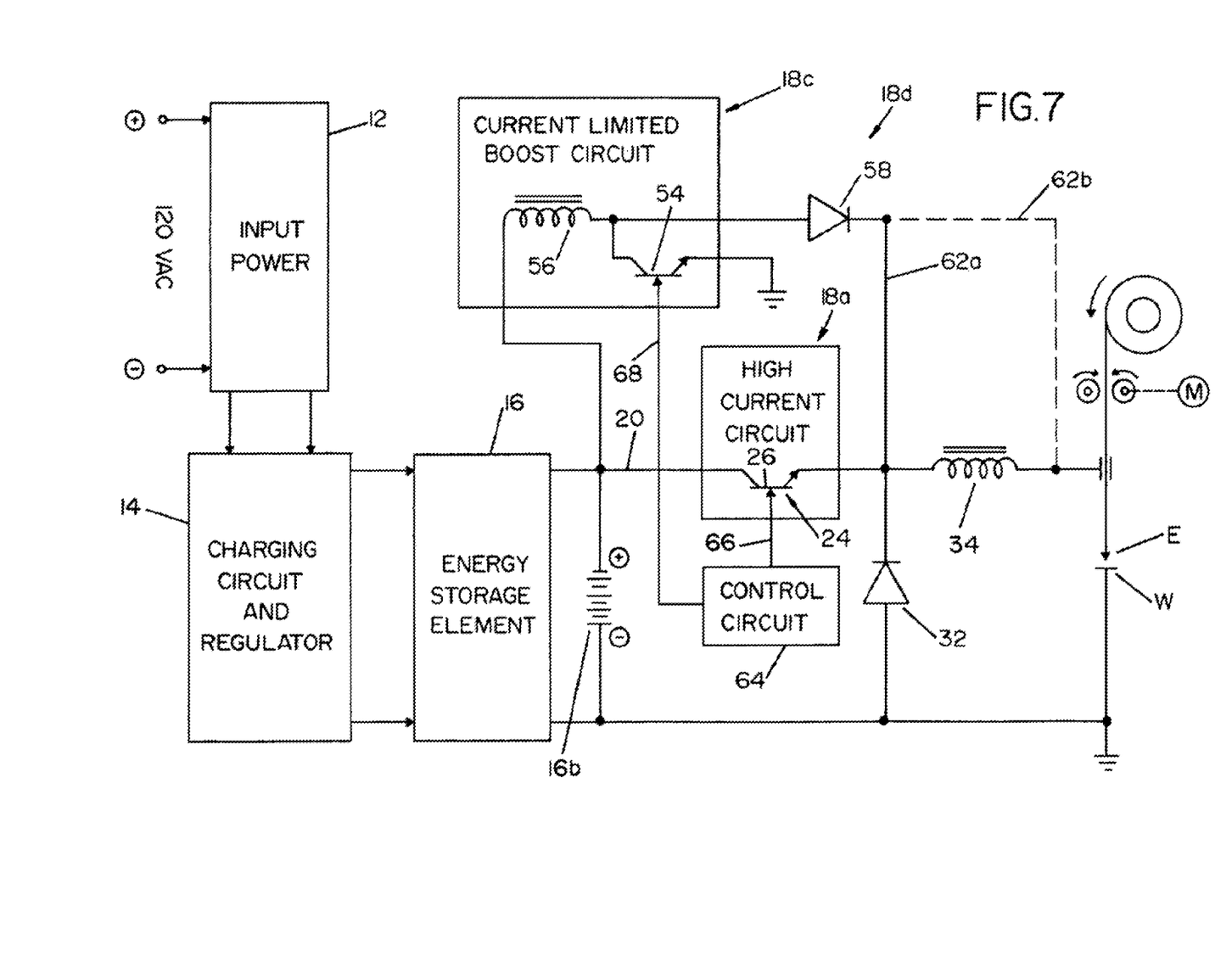
FIG. 7 shows an alternative combination circuit incorporating a high current circuit connected in parallel with a current limited boost circuit.

For some welding processes, more than the conventional 48 volts may be needed. Thus, a combination circuit may be utilized. In this regard, FIG. 7 shows yet another embodiment of the high current welding assembly. In this embodiment, the high current AC welding assembly includes the 120 volt AC input power source 12 coupled to the charging circuit and regulator 14, the energy storage element 16 connected in parallel with the charging circuit and regulator 14, and a combination circuit 18d for controlling the current between the electrode E and the workpiece W.

The combination circuit 18d comprises the down chopper 18a connected in parallel with the boost circuit 18c. In this configuration, the down chopper 18a acts as a "high current circuit," while the boost circuit 18c acts as a "current limited circuit," that is, the output current is less than 100 A. Optionally, the output 62 of the boost circuit 18c may be run through the inductor 34 (62a) for added control of the arc or be connected directly to the load (62b).

The combination circuit 18d also includes a control circuit 64, which typically comprises a waveform generator and a pulse width modulator as described above. In practice, pulses from the output 66 of the control circuit 64 cause the switching device 26 to be opened and closed at a given rate, typically 20 kHz, with the duty cycle being controlled to determine the amount of current directed across electrode E and workpiece W. Similarly, pulses from the output 68 of the control circuit 64 cause the switching device 54 to be opened and closed at around 20 kHz. However, the operating frequency can be at various levels in the normal radio frequency range of 20-100 kHz.

The invention has been described with reference to a preferred embodiment and alternates thereof. It is believed that many modifications and alterations to the embodiments disclosed readily suggest themselves to those skilled in the art upon reading and understanding the detailed description of the invention. It is intended to include all such modifications and alterations insofar as they come within the scope of the present invention.

What is claimed is:

1. An electric arc welding assembly comprising:
    a charging circuit and regulator coupled to an input power source;
    an energy storage element operatively connected to the charging circuit and regulator to supply a weld current output from the electric arc welding assembly, wherein the energy storage element is charged by the charging circuit and regulator; and
    a weld output controller connected in parallel with the energy storage element for controlling a welding arc between an electrode and a workpiece,
    wherein the weld output controller comprises:
        a DC down chopper and a boost converter having respective inputs connected together and to the energy storage element, and respective outputs connected together, for supplying the weld current to the electrode; and
        a pulse width modulator operatively connected to both of the DC down chopper and the boost converter to regulate the weld current.

2. The electric arc welding assembly of claim 1, wherein the energy storage element comprises at least one battery.

3. The electric arc welding assembly of claim 1, wherein the energy storage element comprises at least one capacitor.

4. The electric arc welding assembly of claim 1, wherein the energy storage element comprises at least one battery and at least one capacitor connected in parallel.

5. The electric arc welding assembly of claim 1, wherein the weld output controller further comprises an output choke connected between the electrode and said respective outputs connected together.

6. The electric arc welding assembly of claim 1, wherein the DC down chopper and the boost converter together form a high current circuit connected in parallel with a current limited boost circuit.

7. The electric arc welding assembly of claim 1, wherein the DC down chopper includes an inductor.

8. The electric arc welding assembly of claim 7, wherein the output of the boost converter is connected between the inductor and the electrode.

9. An electric arc welding assembly comprising:
    a charging circuit and regulator coupled to an input power source;
    an energy storage element operatively connected to the charging circuit and regulator to supply a weld current output from the electric arc welding assembly, wherein the energy storage element is charged by the charging circuit and regulator; and
    a weld output controller connected in parallel with the energy storage element for controlling a welding arc between an electrode and a workpiece,
    wherein the weld output controller comprises:
        a step-down converter and a step-up converter having respective input portions connected together and to the energy storage element, and respective output portions connected together, for supplying the weld current to the electrode; and
        a controller circuit operatively connected to both of the step-down converter and the step-up converter to regulate the weld current.

10. The electric arc welding assembly of claim 9, wherein the energy storage element comprises at least one battery.

11. The electric arc welding assembly of claim 9, wherein the energy storage element comprises at least one capacitor.

12. The electric arc welding assembly of claim 9, wherein the energy storage element comprises at least one battery and at least one capacitor connected in parallel.

13. The electric arc welding assembly of claim 9, wherein the weld output controller further comprises an output choke connected between the electrode and said respective output portions.

14. The electric arc welding assembly of claim 9, wherein the step-down converter and the step-up converter together form a high current circuit connected in parallel with a current limited boost circuit.

15. An electric arc welding assembly comprising:

a charging circuit and regulator coupled to an input power source;

an energy storage element operatively connected to the charging circuit and regulator to supply a weld current output from the electric arc welding assembly, wherein the energy storage element is charged by the charging circuit and regulator; and a weld output controller connected in parallel with the energy storage element for controlling a welding arc between an electrode and a workpiece, wherein the weld output controller comprises:

a boost converter comprising a first switching device;

a second switching device connected across the boost converter from an input of the boost converter connected to the energy storage element to an output of the boost converter; and a controller circuit operatively connected to both of first switching device and the second switching device to control respective operations of the first and second switching devices.

16. The electric arc welding assembly of claim 15, wherein the energy storage element comprises at least one battery.

17. The electric arc welding assembly of claim 15, wherein the energy storage element comprises at least one capacitor.

18. The electric arc welding assembly of claim 15, wherein the energy storage element comprises at least one battery and at least one capacitor connected in parallel.

19. The electric arc welding assembly of claim 15, wherein the second switching device is part of a DC down chopper, and respective input portions of the DC down chopper and the boost converter are connected together and respective output portions of the DC down chopper and the boost converter are connected together.

20. The electric arc welding assembly of claim 19, wherein the DC down chopper and the boost converter together form a high current circuit connected in parallel with a current limited boost circuit.

* * * * *